No. 12,013. Reissued July 15, 1902.

W. A. KELLY.

LACING HOOK FOR FLAT LACES.

(Application filed July 17, 1901.)

WITNESSES:

Edward C. Rowland.

Anna R. McCole.

INVENTOR

BY W. A. Kelly

Edward P. Thompson

ATTORNEY

UNITED STATES PATENT OFFICE.

WILLIAM ASHLEY KELLY, OF MOUNT HOPE, KANSAS.

LACING-HOOK FOR FLAT LACES.

SPECIFICATION forming part of Reissued Letters Patent No. 12,013, dated July 15, 1902.

Original No. 667,398, dated February 5, 1901. Application for reissue filed July 17, 1901. Serial No. 68,696.

*To all whom it may concern:*

Be it known that I, WILLIAM ASHLEY KELLY, residing at Mount Hope, in the county of Sedgwick and State of Kansas, have invented certain useful Improvements in Lacing-Hooks for Flat Laces; and I do hereby declare that the following is a full, clear, and exact description of the invention, such as will enable others skilled in the art to which it appertains to make and use the same, reference being had to the accompanying drawings, which form a part of this specification.

This invention has relation to an improvement in lacing-hooks for flat laces.

The aim of my invention is to provide a lace-hook adapted to receive a flat lace to be used in connection with shoes, corsets, and the like, the object being to retain the lace in a flat, uncrumpled, and compact condition.

The use of my lacing-hook permits the employment of an elastic or inelastic lace.

Figure 1:
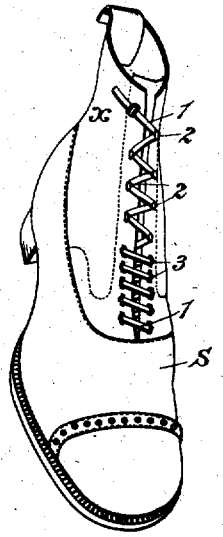
Figure 2:
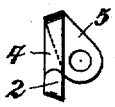
Figure 3:
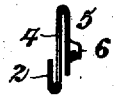
Figure 4:
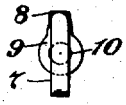
Figure 5:
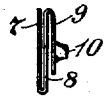
Figure 6:
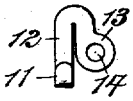
Figure 7:
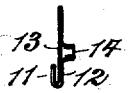

In the accompanying drawings I have shown in Figure 1 a shoe provided with my improved lace-hooks, showing a wide flat lacing in position, a single lace being used. Fig. 2 shows a modification disclosing a hook having sloping turns to fit the slant of the lace. Fig. 3 discloses an edge view of Fig. 2. Figs. 4 and 5 show a modification in which the lacing-bar is disposed squarely over the center of the eyelet. Figs. 6 and 7 show a modification in which a lace-bar is at one side and in the same plane as the top of the eyelet.

In the accompanying drawings, S represents a suitable shoe, to the upper of which is secured a plurality of my flat lacing-hooks 2, one of the lacing-hooks being shown in detail in Figs. 4 and 5. The shoe-upper immediately below these lacing-hooks is slotted and provided with ordinary eyelets 3 3, so that the lace after extending through the eyelet 3 passes through the lacing-hooks 2, as is shown in Fig. 1. The use of an exceedingly broad lace eyelet and hook permits the use of a wide elastic lacing, which has not been possible in previous shoe constructions, so that the use of a wide flat elastic union will insure ease and comfort. The lace is finally secured by any ordinary suitable clasp $x$.

It will be noticed that the invention comprises a triple-bar lacing-hook and embodies an eyelet 10 (see Figs. 4 and 5) of the usual construction, which is secured to the shoe in the ordinary manner, the eyelet being clenched through the leather. Extending from this eyelet is the bar 9, recurved to form the intermediate bar 8, this again being recurved to form the upper bar 7, the three bars being parallel, as may be understood in referring to Fig. 5.

In securing these lacing-hooks to the shoe the lace-bars are extended in alinement with the lace-openings 3 within the shoe. The intermediate bar 8 I term the "lace-bar," because the lacing 1 is made to fold over the same, the top bar 7 forming a sort of keeper or guard, as it were, and the lower bar 9 performing the function of a holder.

In the modification shown in Figs. 2 and 3 the holder-bar 5 is at an angle to the lace-bar, while the guard-bar 2 is slightly shorter than the lace-bar 4.

In Figs. 6 and 7 I show still another modification, in which the holder-bar 13 extends laterally and parallel with the lace-bar 12.

The use of a lacing-hook as disclosed in my invention insures a neat and sightly appearance of the lace. It further enables the operator to use a wide lace, which is much more dressy and can be made so wide and the hooks placed so close together that the slit within the shoe-upper may be entirely hidden by means of the handsome lace, which can of course be made of silk or any other suitable material. The lace, further, does not crumple, as it is compelled to lie flat. The lacing-hooks may be secured, if desired, by means of prongs or be stitched to the shoe-upper.

I do not wish to be confined to a specific sort of eyelet, as the form of the eyelet may be changed without departing from the spirit of my invention.

In the drawings I have shown but one lace, though it should be understood that two laces could be used.

Having thus described my said invention, what I claim as new, and desire to secure by United States Letters Patent, is—

1. A lacing hook or stud comprising a straight bar recurved at both ends forming guards, and adapted to allow the lace to slide freely over the bar, the guard to the free end overlying the bar and lace, and the guard at the other end being provided with means for attaching the stud to a garment.

2. A lace hook or stud comprising a straight bar sharply recurved at both ends to form guards, leaving a space between each guard and the bar only equal to the thickness of the lace, the guard to the free end overlying the bar, and the guard to the other end being folded under the bar and provided with means for attaching it to the garment.

3. A lace hook or stud comprising a straight flat bar having recurved ends folded one over, one under the bar, the creases at the folds being oblique to the working edge of the bar and parallel to the edge of the lace when in use, whereby the lace is held flat and prevented from becoming frayed or rolled up at the edges.

4. A lacing hook or stud consisting of a piece of material adapted to be attached to a garment, and provided with slots, which have parallel side walls, for the reception of flat lacing, which slots have their entrances for said lacing equal at least to the full width of the slots, said entrances being located at opposite sides of said piece.

5. A lacing hook or stud consisting of a piece of material adapted to be attached to a garment, and provided with slots, which have parallel side walls, for the reception of flat lacing, which slots have their entrances for said lacing equal at least to the full width of the slots, said entrances being located at different sides of said piece.

6. A lacing hook or stud consisting of a piece of material adapted to be attached to a garment, and provided with a slot, which has parallel side walls, for the reception of flat lacing, which slot has its entrance for said lacing equal at least to the full width of the slot, and a guard for retaining the lacing in the slot, which guard is located at the opposite side of said piece from the slot.

7. A lacing hook or stud consisting of a piece of material adapted to be attached to a garment, and provided with a slot, which has parallel side walls, for the reception of flat lacing, which slot has its entrance for said lacing equal at least to the full width of the slot, and a guard for retaining the lacing in the slot, which guard is located at a different side of said piece from the slot.

8. A lacing hook or stud consisting of a piece of material adapted to be attached to a garment, and provided with a slot, which has parallel side walls, for the reception of flat lacing, which slot has its entrance for said lacing equal at least to the full width of the slot, and a guard for retaining the lacing in the slot.

In testimony whereof I have hereunto subscribed my name this 10th day of June, 1901.

WILLIAM ASHLEY KELLY. [L. S.]

Witnesses:

F. C. JORGENSEN,

H. O. HARRIS.